United States Patent
Guha et al.

(10) Patent No.: US 11,308,407 B1
(45) Date of Patent: Apr. 19, 2022

(54) ANOMALY DETECTION WITH FEEDBACK

(71) Applicant: Amazon Technologies, Inc., Seattle, WA (US)

(72) Inventors: Sudipto Guha, Jersey City, NJ (US); Tal Wagner, Cambridge, MA (US); Shiva Prasad Kasiviswanathan, Dublin, CA (US); Nina Mishra, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1075 days.

(21) Appl. No.: 15/842,291

(22) Filed: Dec. 14, 2017

(51) Int. Cl.
*G06N 20/00* (2019.01)
*G06N 5/04* (2006.01)
*G06F 16/901* (2019.01)

(52) U.S. Cl.
CPC ......... *G06N 5/047* (2013.01); *G06F 16/9024* (2019.01); *G06N 20/00* (2019.01)

(58) Field of Classification Search
CPC ..... G06N 5/047; G06N 20/00; G06F 16/9024
See application file for complete search history.

(56) References Cited

U.S. PATENT DOCUMENTS

2013/0338965 A1* 12/2013 Ide ................. G06K 9/6284
  702/181
2016/0253672 A1* 9/2016 Hunter ............ G06Q 20/4016
  705/39

OTHER PUBLICATIONS

Guha, Sudipto, et al. "Robust random cut forest based anomaly detection on streams." International conference on machine learning. PMLR, (Year: 2016).*
Wu et al. "Rs-forest: A rapid density estimator for streaming anomaly detection." 2014 IEEE International Conference on Data Mining. IEEE (Year: 2014).*
Manzoor et al., "Fast memory-efficient anomaly detection in streaming heterogeneous graphs." Proceedings of the 22nd ACM SIGKDD International Conference on Knowledge Discovery and Data Mining (Year: 2016).*
Zhu et al."Semi-supervised learning using gaussian fields and harmonic functions." Proceedings of the 20th International conference on Machine learning (ICML-03) (Year: 2003).*
Dornaika et al. "Efficient dynamic graph construction for inductive semi-supervised learning." Neural Networks 94 (Year: 2017).*

* cited by examiner

*Primary Examiner* — Michael J Huntley
*Assistant Examiner* — Adam C Standke
(74) *Attorney, Agent, or Firm* — Nicholson De Vos Webster & Elliott LLP

(57) ABSTRACT

Examples of techniques for anomaly detection with feedback are described. An instance includes a technique is receiving a plurality of unlabeled data points from an input stream; performing anomaly detection on a point of the unlabeled data points using an anomaly detection engine; pre-processing the unlabeled data point that was subjected to anomaly detection; classifying the pre-processed unlabeled data point; determining the anomaly detection was not proper based on a comparison of a result of the anomaly detection and a result of the classifying of the pre-processed unlabeled data point; and in response to determining the anomaly detection was not proper, providing feedback to the anomaly detection engine to change at least one emphasis used in anomaly detection.

21 Claims, 16 Drawing Sheets

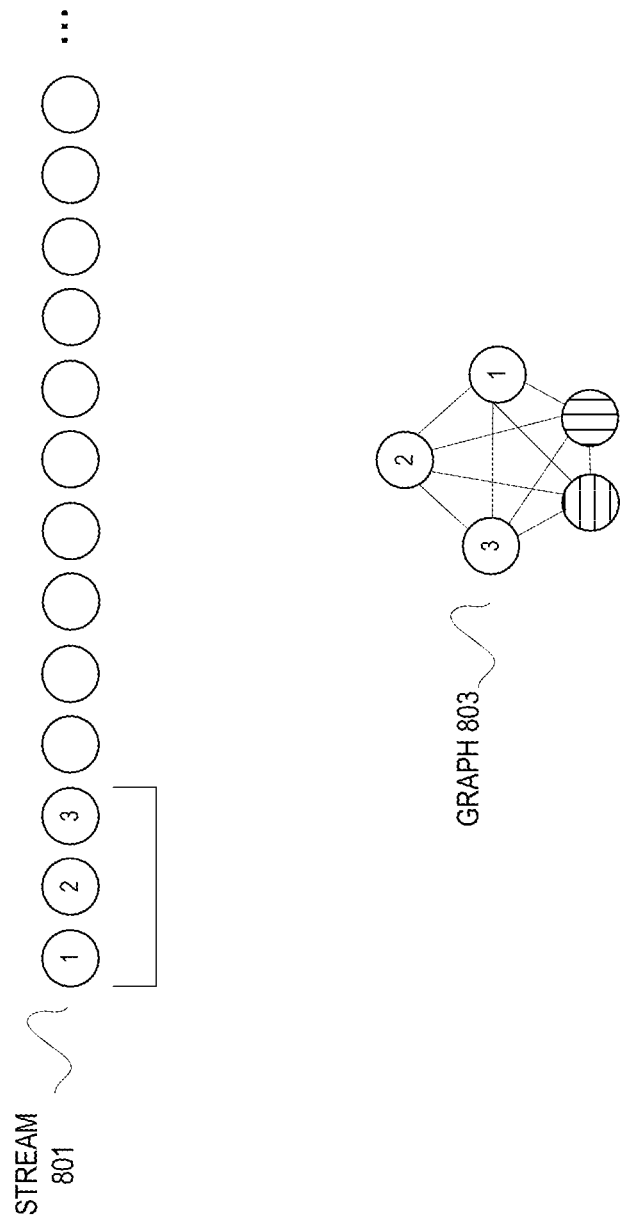

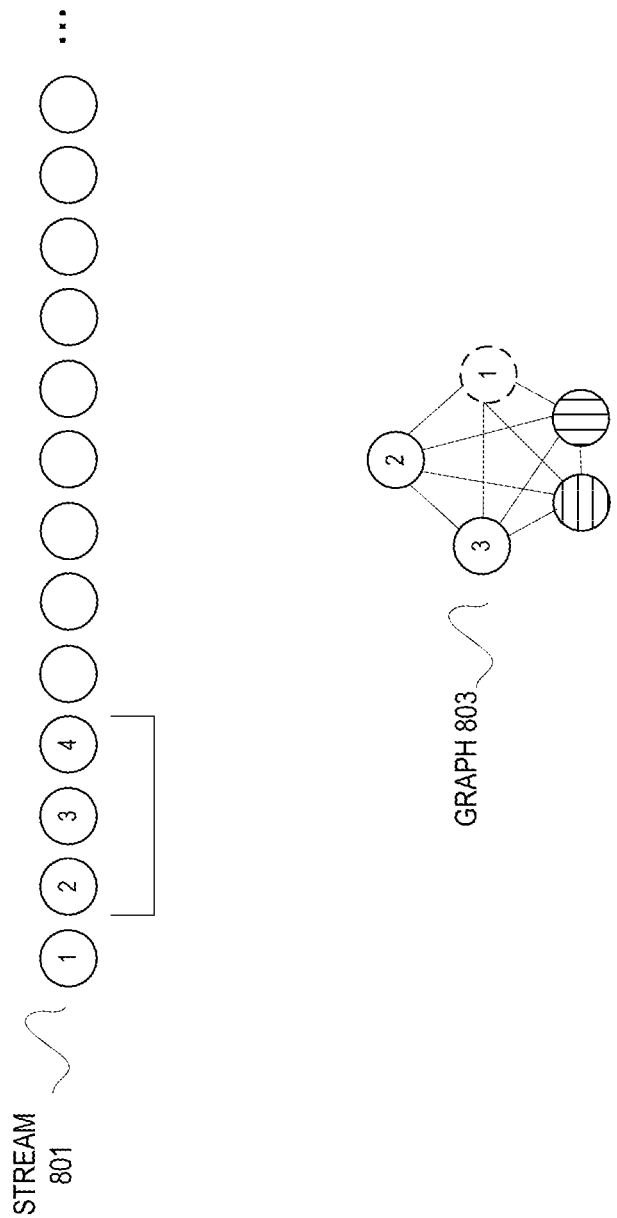

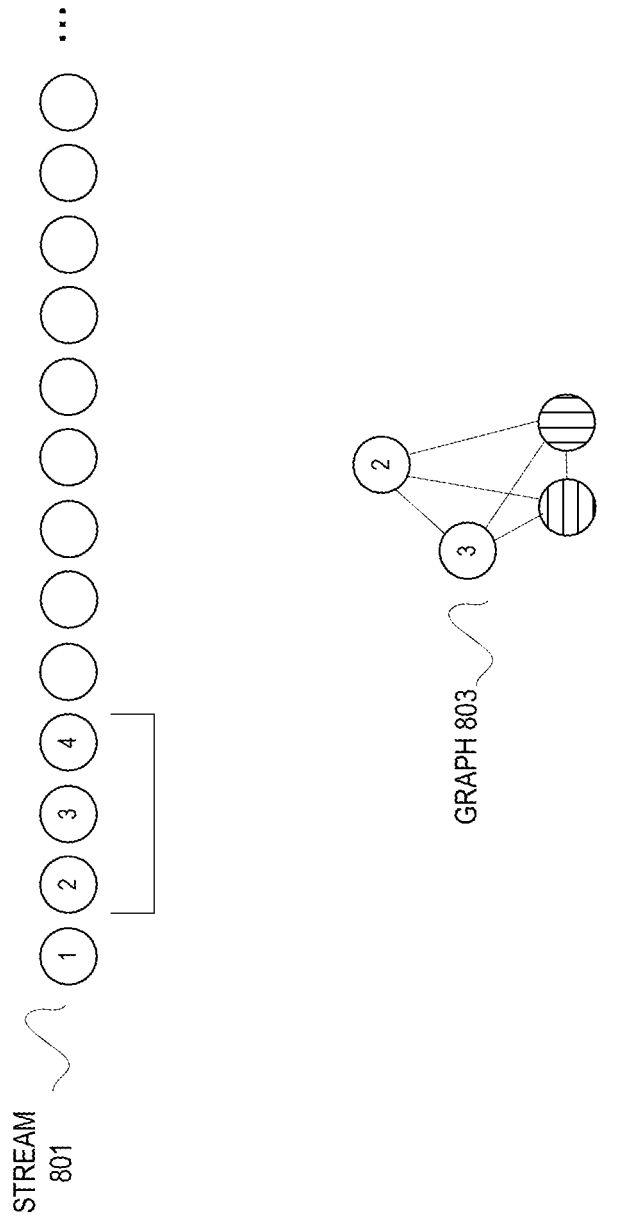

|  | POINT-0.733 | POINT-0.735 | POINT-0.737 | POSITIVE | NEGATIVE |
|---|---|---|---|---|---|
| POINT-0.733 | 11.8 | -1.04 | -0.85 | -6.56 | -3.36 |
| POINT-0.735 | -1.04 | 9.88 | -0.95 | -5.11 | -2.78 |
| POINT-0.737 | -0.85 | -0.95 | 6.79 | -3.10 | -1.88 |
| POSITIVE | -6.55 | -5.11 | -3.10 | 47.44 | -32.67 |
| NEGATIVE | -3.36 | -2.78 | -1.88 | -32.67 | 40.70 |

|  | POINT-0.735 | POINT-0.737 | POSITIVE | NEGATIVE |
|---|---|---|---|---|
| POINT-0.735 | 9.79 | -1.02 | -5.68 | -3.07 |
| POINT-0.737 | -1.02 | 6.73 | -3.57 | -2.12 |
| POSITIVE | -5.68 | -3.57 | 43.81 | -34.54 |
| NEGATIVE | -3.07 | -2.12 | -34.54 | 39.74 |

|           | POINT-0.726 | POINT-0.735 | POINT-0.737 | POSITIVE | NEGATIVE |
|-----------|-------------|-------------|-------------|----------|----------|
| POINT-0.726 | .36       | 0           | 0           | 0        | -3.36    |
| POINT-0.735 | 0         | 9.79        | -1.02       | -5.68    | -3.07    |
| POINT-0.737 | 0         | -1.02       | 6.73        | -3.57    | -2.12    |
| POSITIVE    | 0         | -5.68       | -3.57       | 43.81    | -34.54   |
| NEGATIVE    | -0.36     | -3.07       | -2.12       | -34.54   | 39.74    |

ANOMALY DETECTION WITH FEEDBACK

BACKGROUND

Machine learning ("ML") problems start with data—preferably, lots of data (examples or observations) for which the target answer is already known. Data for which the target answer is known is called labeled data. All other data is unlabeled. In supervised ML, the algorithm teaches itself to learn from the labeled examples that are provided.

BRIEF DESCRIPTION OF DRAWINGS

Various embodiments in accordance with the present disclosure will be described with reference to the drawings, in which:

FIGS. 8(A)-(D) illustrate an example of a stream of unlabeled data and its impact on a graph.

FIGS. 9(A)-(C) illustrate an example of a stream of unlabeled data and its impact on a graph as shown as matrices.

DETAILED DESCRIPTION

Figure 1:
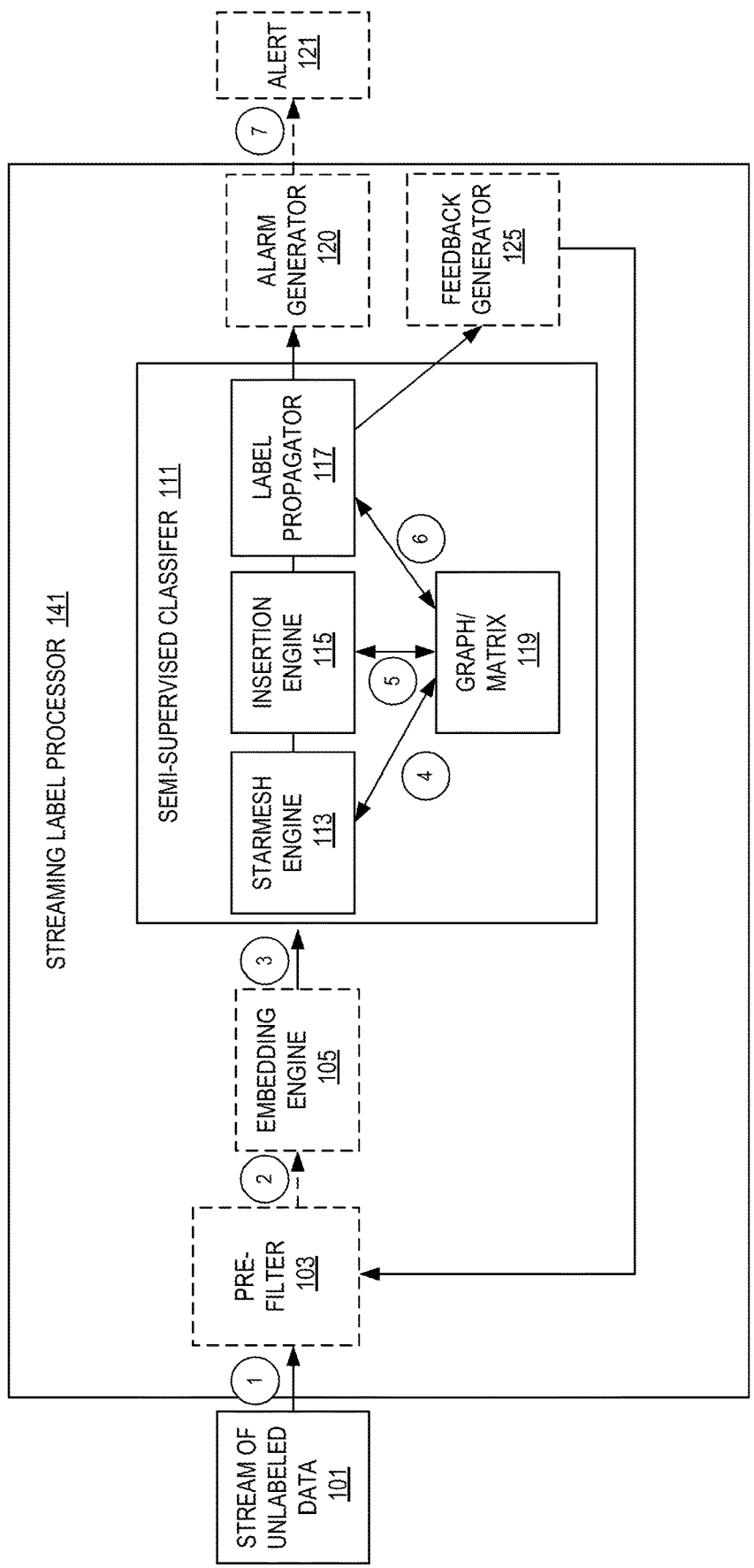
FIG. 1 illustrates an embodiment of a system utilizing a streaming label processor.

Various embodiments of methods, apparatuses, systems, and non-transitory computer-readable storage media for anomaly detection with feedback and streaming label processing are described.

Traditionally, semi-supervised learning algorithms have been used to alleviate human labor in large data settings. For example, Label-Propagation and Label-Spreading algorithms are available in many software libraries. Yet in the context of detecting rare events over a dynamic, high-velocity data stream, many interesting issues arise that standard approaches have a difficult time dealing with. For example, not all anomalies in data sets are alike. Additionally, even when anomalies exist, not all anomalies should generate an alert. This implies that labeling uninteresting anomalies may not be beneficial. Accordingly, embodiments described herein provide a general anomaly detection framework adaptable to an anomaly class of interest. In particular, label spreading is useful in a variety of real-world applications. Generally, labels are rare (e.g., security attacks, server failures), are cumbersome to curate (e.g., derive from a cause of error ticket), expensive to obtain (e.g., a medical expert generates ground truth), and/or stream (i.e., not all labels are available up front, but stream over time).

In some systems, a label propagation for semi-supervised learning is performed in batches. The input is a weighted undirected graph $G(V;E;w)$ with n nodes, in which some nodes are labeled with 0, some are labeled with 1, and with most being unlabeled. The (weighted) degree of a node is the sum of the edge weights connected to it. In some embodiments, the goal is to compute fractional labels in [0; 1] for the unlabeled points that would represent a good partition of the nodes into a 0-set and a 1-set.

Typically, a model is trained in using batch processing for label propagation and the model is applied on a stream in real-time. This approach does not allow for fast model updates.

Detailed herein are embodiments of semi-supervised learning performed on streams of labels. In particular, a graph H is maintained that has $\tau$ nodes representing the most recent $\tau$ unlabeled points seen in a stream of data and at least two additional nodes representing labeled points (e.g., an additional node representing all "0"-labeled points in the stream and one representing all "1"-labeled points in the stream). For example, a two-label graph has nodes for known labels of "1" and "0" and a set number of other nodes for unlabeled points. For illustrative purposes, an exemplary usage is a graph where a known label of "1" corresponds to the input data representing a that label and a label of "0" corresponds to the input data representing that label. Each new unlabeled point may cause an update to the graph H by causing an oldest node in the graph to be removed, creating a new node for the new unlabeled point, and computing labels for the unlabeled nodes currently in graph H. In some embodiments, the computed labels are fractional labels.

For example, car companies have a few pictures of how a construction zone appears to a self-driving car and they would like to generalize from this small quantity of labeled data to the vast quantity of unlabeled data. Generalizing from this small quantity of labeled data (small because it is expensive to obtain ground truth and curate) to a large quantity of unlabeled data is good use case for label spreading.

Unlike batch label processing, the streaming label propagation utilized by embodiments detailed herein addresses a technical problem of large memory usage in batch processing because each graph (matrix) has a defined maximum dimension. When a node is removed, it is replaced with the same amount of information for the new node. As a result, no additional nodes are added.

In some embodiments, streaming label propagation is utilized in anomaly detection. For example, a stream of data is watched and when a new point in the stream is an inlier (consistent with the normal/expected data), the new point is ignored. When the new point is an outlier, then the labeled data (the graph detailed above) is consulted. The labeled data consists of positive and negative examples of anomalies such as false alarms and missed alarms. A streaming label propagation is used to determine if the new point p is more similar to a positive or a negative labeled example as detailed in the graph. In some embodiments, more similar means the probability that a random walk starting from p ends up at a positive or negative labeled node. When p is more similar to a positive example of an anomaly, an alarm may be generated indicating that an anomaly has been detected. Otherwise, no alarm is generated.

FIG. 1 illustrates an embodiment of a system utilizing a streaming label processor. The streaming label processor 141 includes a semi-supervised classifier 111 to perform streaming label propagation. Typically, this classifier 111 includes one or more engines to perform this propagation.

These engines (and other shown components) are typically software stored in memory and executed by a processor; however, in some embodiments, the engines are one or more hardware devices such as one or more application specific integrated circuits (ASICs) or combinatorial logic programmed into a field programmable gate array (FPGA). In some embodiments, the streaming label processor 141 is provided as a web service (remote server based) and is called through the use of an application programming interface (API). In other embodiments, streaming label processor 141 is provided locally. In other embodiments, functionality of the streaming label processor 141 is split between local and remote server based.

As detailed above, a graph is maintained during streaming label propagation. In this illustration, the graph is stored as a matrix 119 in memory; however, other data structures may be used. First, a star-mesh engine 113 removes an oldest node and connections to/from the oldest node in the graph 119 upon receiving a new unlabeled point. The insertion engine 115 creates a new node for the new unlabeled point in graph 119 and connects the new node to the other nodes in the graph 119. The label propagator 117 then computes labels for the unlabeled nodes currently in the graph 119. In some embodiments, the computed labels are fractional labels, though, in other embodiments the computed labels are of other types such as integers, text/characters, Booleans, etc. More specific examples of these actions are detailed in other figures.

The streaming label processor 141 may also include other or alternate components depending upon the implementation used., or may be coupled with other components. For example, in some embodiments, an embedding engine 105 is coupled to the classifier 111 to convert from time-space to a multi-dimensional space for incoming data points. In some embodiments, the embedding is a shingled difference operator. This allows for distinguishing between different types of incoming labels. For example, in the context of compute resource anomalies, the use of a shingled difference operator (or "shingled differencing") allows for distinguishing between sustained spikes (or dips) and fleeting spikes (or dips) in the data. Shingled differencing also allows for distinguishing between some types of heart arrhythmias, etc. A discussion of shingles and shingled difference operators are detailed with respect to FIGS. 3-5.

Figure 3:
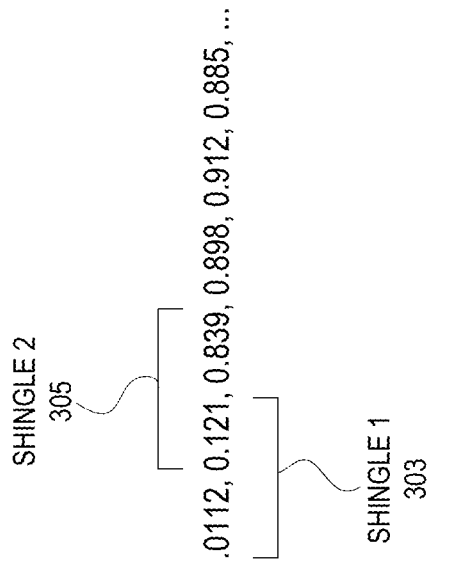
FIG. 3 illustrates an example of shingles comprising data points from a stream with anomalies.
Figure 3:
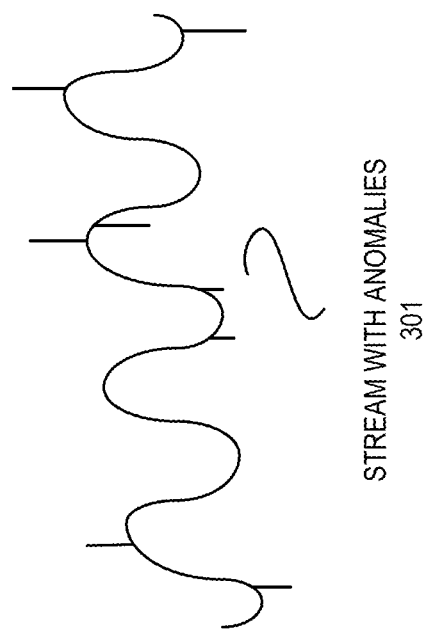
Figure 3:
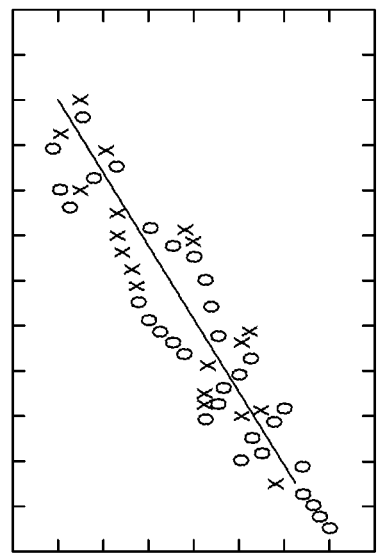

FIG. 3 illustrates an example of shingles comprising data points from a stream with anomalies As illustrated, the stream with anomalies 301 has several spikes and dips that are anomalous to the regular sinusoidal pattern. Examples of these data points are shown in the upper right portion of the figure. A shingle comprises two or more of these data points in a sliding window. For example, shingle 1 303 includes a first and a second point in a first sliding window. Shingle 2 305 includes at least one data point from the first shingle (0.121 in this example) and a subsequent data point. As such, shingle 2 305 is the window shingle 1 303 shifted by one data point. Of course, the data points do not need to be anomalies and shingles can be utilized on normal data. In the lower right of the figure, the dips and spikes of shingles are plotted.

Figure 4:
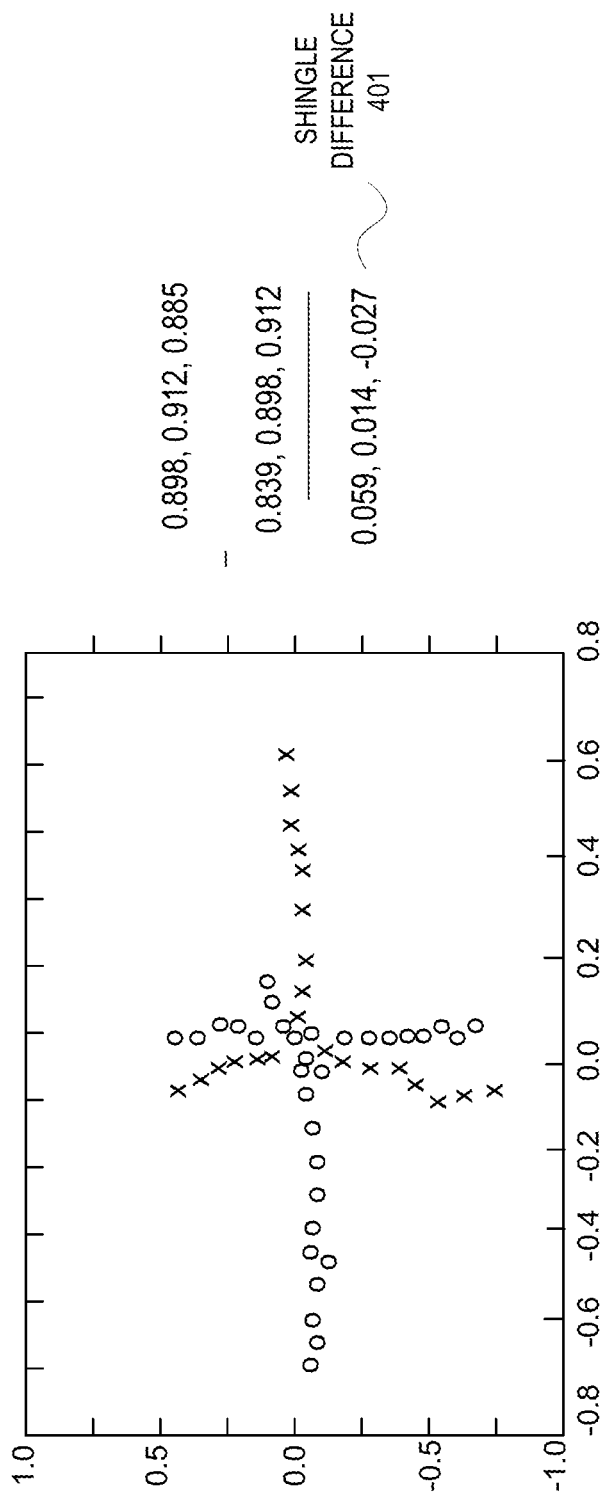
FIG. 4 illustrates an example of generating a shingle difference.

FIG. 4 illustrates an example of generating a shingle difference. In this example, a shingle includes three points and a second shingle is subtracted from a first shingle to generate a shingle difference 401. Here the dips and spikes are shown as shingle differences.

Figure 5:
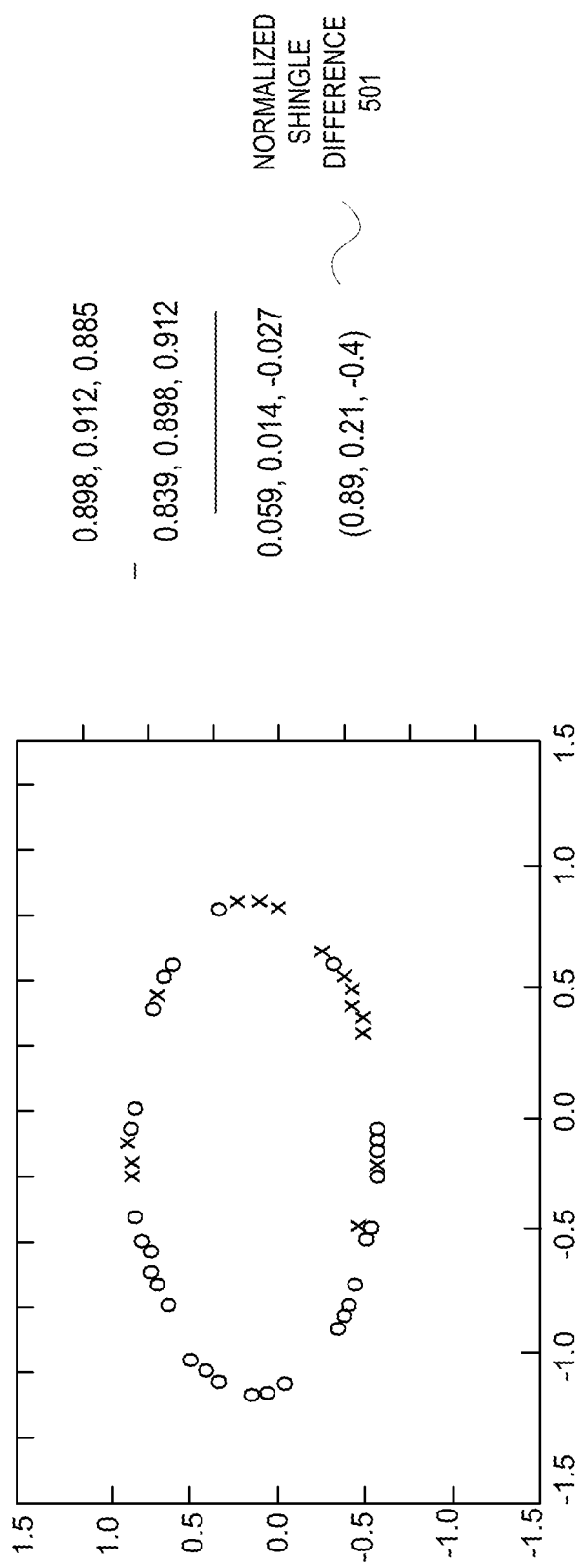
FIG. 5 illustrates an example of generating a normalized shingle difference.

FIG. 5 illustrates an example of generating a normalized shingle difference. In this example, a shingle includes three points and a second shingle is subtracted from a first shingle to generate a shingle difference and that difference is then normalized to generate a normalized shingle difference 501. Here the dips and spikes are shown as normalized shingle differences which provides for more concentrated groupings of spikes and dips.

Turning back to FIG. 1, in some anomaly detection embodiments, an pre-filter 103 interacts first with the raw data of stream (e.g., real-time, or near real-time) of unlabeled data 101. There are many different pre-filter techniques that may be applied depending upon the embodiment such as anomaly detection, filtering with specified thresholds, or a machine learned solution.

In an embodiment, the pre-filter 103 performs a robust random cut forest (RRCF) detection, however, any anomaly detection method may be used. In some examples, the anomaly detection method is called using an API as a part of a web service. When an pre-filter 103 is used, the output (in some embodiments, anomalies, or both anomalies and non-anomalies, and/or supporting metadata indicating findings of the anomaly detection, data, and in other embodiments, just data associated with an anomaly) are provided to the classifier 111 (but to the embedding engine 105 first, when used). The use of an pre-filter 103 limits that amount of data to process.

Finally, in some embodiments, an alarm generator 120 processes the output of the classifier 111 to generate an alert for new unlabeled data that is of interest. For example, unlabeled data of interest may include data that is more like a "0" label than a "1" label.

An exemplary operation of the streaming label processor 141 is as follows. A stream of unlabeled data 101 is generated by some device(s). This data may be of any type including, but not limited to, visual data (such as data from a video camera), diagnostic data (such as EKG information), physical data (such as stress on mechanical parts), sensor data (such as radar or lidar data), compute data (such as an amount of traffic on a website), etc. However, what the data means is not readily known (hence it is "unlabeled"). The stream of unlabeled data 101 is provided to the streaming label processor 141 at circle 1. As noted, the streaming label processor 141 may be local (such as a part of an EKG machine) or remote (such as part of a web service) to/from the source of the stream of unlabeled data 101.

For anomaly detection, the pre-filter 103 takes this stream of unlabeled data 101 and determines if there are any anomalies and provides an output as detailed above at circle 2. Note, if anomaly detection is not the focus, in some embodiments, the stream of unlabeled data 101 is provided to the embedding engine 105 or classifier 111.

When the stream of unlabeled data 101 or anomalies from circle 2 require conversion into a multidimensional space, the embedding engine 105 performs this conversion (embedding) and provides the embedded data to the classifier 111 at circle 3. For example, shingled difference data is provided to the classifier 111. In some embodiments, the stream of unlabeled data 101 or anomalies thereof is already in a format readily usable by the classifier and no embedding is needed.

The classifier 111 takes its input and performs streaming label processing. The input to the classifier 111 is a stream of points, $x1, x2, x3, \ldots \in R^d$. The star-mesh engine 113 removes an oldest node and its connections in the graph 119 upon receiving a new unlabeled point from the stream at circle 4. The insertion engine 115 creates a new node for the new unlabeled point in graph 119, creates a new node for the new unlabeled point in graph 119 and connects the new node to the other nodes in the graph 119 at circle 5. The label propagator 117 then computes labels for the unlabeled nodes currently in the graph 119 at circle 6. In some embodiments, the computed labels are fractional labels. More specific examples of these actions are detailed in other figures.

After the graph 119 is updated (streaming label processing is complete), in some embodiments, an alarm generator 120 receives output of the semi-supervised classifier 111 and analyzes a result of the processing (e.g., the update) to decide whether to generate and send an alert 121 at circle 7. For example, if an alert was set to be generated upon an unlabeled point looking more like a "hotdog" than not, then an alert 121 is generated. In some embodiments, the alarm generator 120 may analyze both the output of the semi-supervised classifier 111 as well as the output of the pre-filter 103 to allow for more nuanced determinations of whether an alarm is to be generated. For example, the alarm generator 120 may generate an alert 121 if the pre-filter 103 did not identify an input datum as an anomaly while the classifier 111 did identify it as an anomaly. The generation of an alert could be based on more than one iteration of streaming label processing.

In some embodiments, the label propagator 117 of the semi-supervised classifier 111 outputs information about the unlabeled data (e.g., anomalous or not) that was classified to a feedback generator 125. The feedback generator 125 uses this information (and/or information from the graph/matrix 119) to inform (or update) pre-filter 103 using feedback. The feedback is the agreement/disagreement with that determination of an anomaly or not, and the pre-filter 103 uses this information to improve itself based on that feedback. In some embodiments, the feedback is an indication that the pre-filter 103 should change an emphasis (e.g., one or more weights used by the anomaly detection logic) on different dimensions/coordinates of the unlabeled data. As such, the anomaly scores change and therefore so does the subsequent vending of the decision of anomaly/not-an-anomaly by the pre-filter 103.

Figure 2:
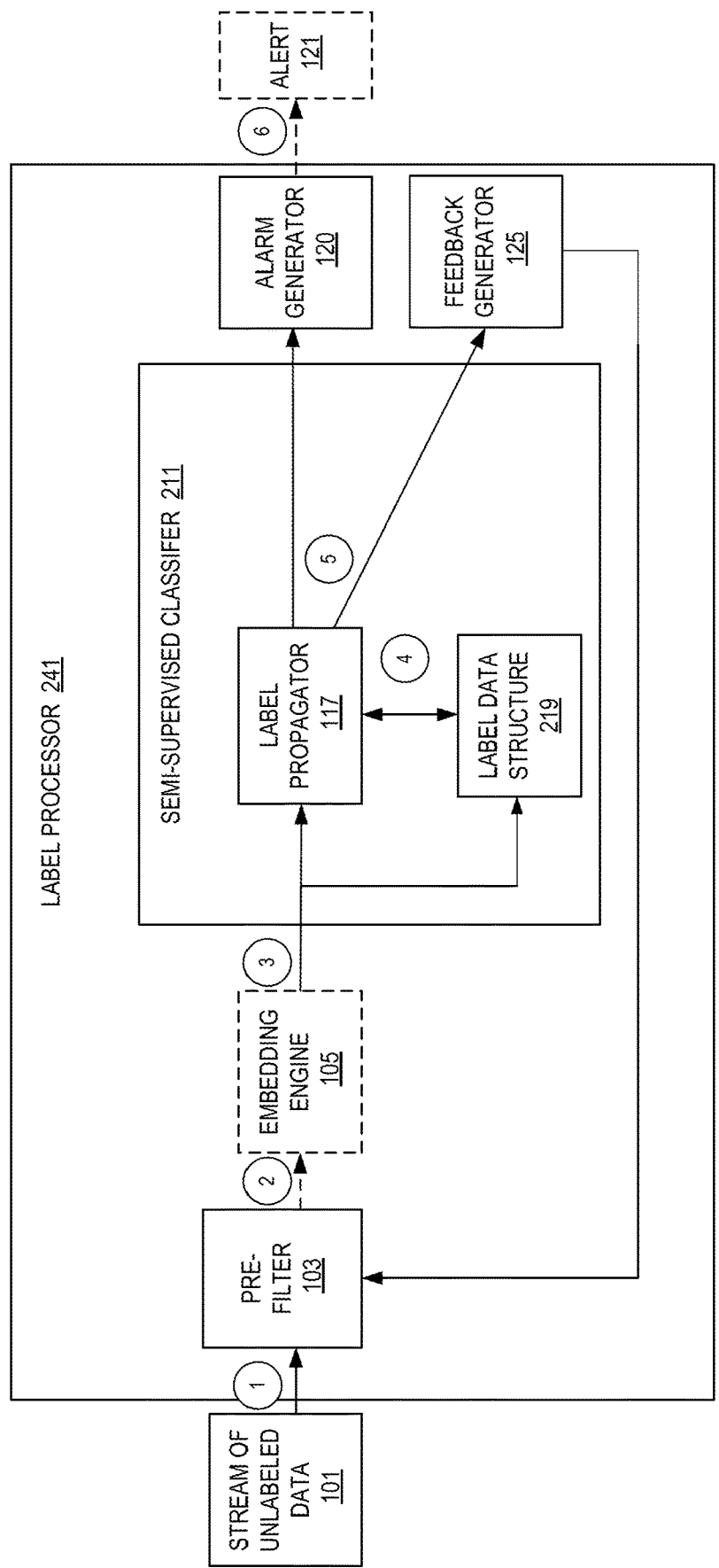
FIG. 2 illustrates an embodiment of a system utilizing a label processor.

FIG. 2 illustrates an embodiment of a system utilizing a label processor. The label processor 241 includes a classifier 211 to perform label propagation. Typically, this classifier 211 includes one or more engines to perform this propagation. These engines (and other shown components) are typically software stored in memory and executed by a processor; however, in some embodiments, the engines are one or more hardware devices such as one or more application specific integrated circuits (ASICs) or combinatorial logic programmed into a field programmable gate array (FPGA). In some embodiments, the label processor 241 is provided as a web service (remote server based) and is called through the use of application programming interfaces (APIs). In other embodiments, label processor 241 is provided locally. In other embodiments, functionality of the label processor 241 is split between local and remote server based.

A label data structure 219 such as the matrix or graph is maintained during label propagation. The graph specifies a distance between some vertices in the graph, but not necessarily all. To compute the label of a vertex, the probability that a random walk starting at that vertex ends up at a positive or negative label is computed.

A label propagator 117 computes labels for the unlabeled nodes currently in the label data structure 219. Other label data structures 219 such those used by k-nearest neighbor (kNN) used in machine learning models are used in some embodiments. In some embodiments, the computed labels are fractional labels. More specific examples of these actions are detailed in other figures.

The label processor 241 may also include other and/or additional components depending upon the implementation used. For example, in some embodiments, an embedding engine 105 is coupled to the classifier 211 to convert from time space to a multi-dimensional space for incoming data points. In some embodiments, the embedding is a shingled difference operator. This allows for distinguishing between different types of incoming labels. For example, in the content of compute resource anomalies, this allows for distinguishing between sustained spikes (or dips) and fleeting spikes (or dips) in the data.

In some anomaly detection embodiments, a pre-filter 103 interacts first with the raw data of stream of unlabeled data 101. In an embodiment, the pre-filter 103 performs a robust random cut forest (RRCF) detection, however, other anomaly detection methods known to those of skill in the art may be used. In some examples, the anomaly detection method is called using an API as a part of a web service. When an pre-filter 103 is used, the output (anomalies, or both anomalies and non-anomalies, and/or supporting metadata indicating findings of the anomaly detection, data, etc.) are provided to the classifier 211 (but to the embedding engine 105 first, when used). The use of a pre-filter 103 limits that amount of data to process.

Finally, in some embodiments, an alarm generator 120 processes the output of the classifier 211 to generate an alert for new unlabeled data that is of interest. For example, unlabeled data of interest may include data that is more like a "0" label than a "1" label.

An exemplary operation of the label processor 241 is as follows. A stream of unlabeled data 101 is generated by some device. This data may be of any type including, but not limited to, visual data (such as data from a video camera), diagnostic data (such as EKG information), physical data (such as stress on mechanical parts), sensor data (such as radar or lidar data), compute data (such as an amount of traffic on a website), etc. However, what the data means is not readily known (hence it is "unlabeled"). The stream of unlabeled data 101 is provided to the label processor 241 at circle 1. As noted, the label processor 241 may be local (such as a part of an EKG machine) or remote (such as part of a web service).

For anomaly detection, the pre-filter 103 takes this stream of unlabeled data 101 and determines if there are any anomalies. Any anomalies are output at circle 2. Note, if anomaly detection is not the focus, in some embodiments, the stream of unlabeled data 101 is provided to the embedding engine 105 or classifier 211.

When the stream of unlabeled data 101 or anomalies from circle 2 require conversion into a multidimensional space, the embedding engine 105 performs this conversion (embedding) and provides the embedded data to the classifier 211 at circles 3. For example, shingled difference data is provided to the classifier 211. In some embodiments, the stream of unlabeled data 101 or anomalies thereof is already in a format readily usable by the classifier and no embedding is needed.

The classifier 211 takes its input and performs label processing using label propagator 117. The label propagator 117 then computes labels for the unlabeled nodes currently in the label data structure at circle 4. In some embodiments, the computed labels are fractional labels.

After the label data structure 219 is updated (label processing is complete), in some embodiments, an alarm generator 120 receives output of the semi-supervised classifier 211 and analyzes a result of the processing (e.g., the update) to decide whether to generate and send an alert 121 at circle 7. For example, if an alert was set to be generated upon an unlabeled point looking more like a "hotdog" than not, then an alert 121 is generated. Of course, the generation of an alert could be based on more than one iteration of label processing.

In some embodiments, the label propagator 117 of the semi-supervised classifier 211 outputs information about the unlabeled data (e.g., anomalous or not) that was classified to a feedback generator 125 also at circle 5. The feedback generator 125 uses this information (and/or information from the graph/matrix 119) to inform for pre-filter 103 using feedback. The feedback is the agreement/disagreement with that determination of an anomaly or not, and the pre-filter 103 uses this information to improve itself based on that feedback. In some embodiments, the feedback is an indication that the pre-filter 103 should change an emphasis on different dimensions/coordinates of the unlabeled data. As such, the anomaly scores change and therefore so does the vending of the decision of anomaly/not-an-anomaly.

In some embodiments, the components of the streaming label processor 141 or label processor 241 may be the same physical device or on different physical devices. For example, there the pre-filter 103 may be on one device (for example, in an EKG machine) and the embedding engine 105 and classifier 111 in another device (for example, as a web service).

Figure 6:
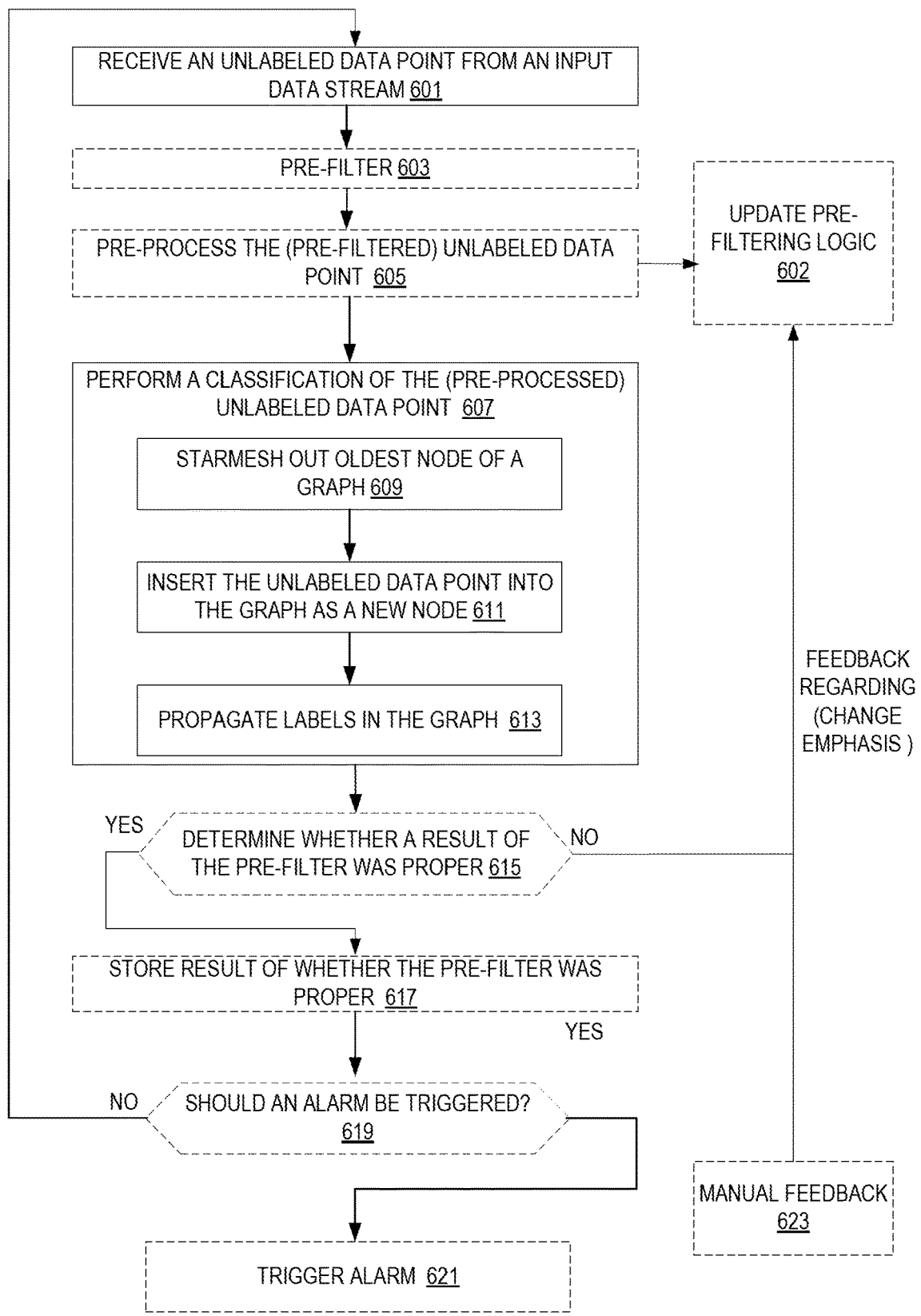
FIG. 6 illustrates an embodiment of a method for performing streaming label processing.

FIG. 6 illustrates an embodiment of a method for performing streaming label processing. In some embodiments, this method is performed by a streaming label processor such as that detailed with respect to FIG. 1.

At 601, at least one unlabeled data point from an input data stream is received. For example, a stream of unlabeled data points is provided to the streaming label processor 141.

In some embodiments, pre-filtering is performed at 603. Pre-filtering is performed by excluding points that satisfy a condition, such as, are all greater than 0, are all anomalies, or are all not anomalies, all satisfy a machine learned function, etc. For example, in some embodiments, anomaly detection is performed on the unlabeled data point to determine if the unlabeled data is anomalous with respect to past input at 603. For example, anomaly detection may include perform RRCF detection by pre-filter 103. In some embodiments, the output of an anomaly detection is an indication of an anomaly (or not) and the data (or an identifier of the data, and/or findings and other metadata created by the anomaly detection). In other embodiments, it is only the data that is anomalous. For ease of description, this output is called an "unlabeled data point" at times below. In some embodiments, pre-filter logic (e.g., pre-filter 103) is directed to be updated (such as renormalized) at this point at 602.

The output of the pre-filtering is subjected to pre-processing at 605 in some embodiments (where pre-processing is beneficial). For example, block 605 may be performed by the embedding engine 105 and include pre-processing operations such as a shingled difference calculation. At this point, the pre-filter logic (e.g., pre-filter 103) is directed to be updated (such as renormalized) in some embodiments at 602. F A classification of the (pre-processed and/or pre-filtered) unlabeled data point is made at 607. For example, the classifier 111 classifies the unlabeled data using streaming label processing. As noted, a graph H that has τ nodes representing the most recent τ unlabeled points seen in the stream, and at least two additional nodes, is maintained. Altogether, as an invariant, graph H contains τ+2 nodes.

At 609, the oldest node from the graph is removed. In some embodiments, this removal is performed as a starmesh that removes the node from the graph and modifies the remaining edge weights to reflect the location information of the removed node. In some embodiments, the weight of the most recent edges is increased during this process. In some embodiments, the weight is decreased.

In some embodiments, as detailed above, the graph is represented with one or more matrices. The weight matrix is $W \in R^{n \times n}$ and is defined as $W(x,y)=w_{xy}$ for every pair of nodes x, y. The Laplacian matrix of the graph is defined as:

Diagonal entries: $L(x; x)=\deg(x)$.

Off-diagonal entries: $L(x; y)=L(y; x)=-w_{xy}$.

In block-matrix form, L and W are stored by separating rows and columns that correspond to unlabeled points ("u") from those that correspond to labeled points ("l").

$$W = \begin{bmatrix} W_{uu} & W_{ul} \\ W_{lu} & W_{ll} \end{bmatrix} \text{ and } L = \begin{bmatrix} L_{uu} & L_{ul} \\ L_{lu} & L_{ll} \end{bmatrix}$$

In some embodiments, this means that the node x from H that corresponds to the input point is removed, along with all its adjacent edges. Then, for every pair of remaining nodes y, z in H, it is set:

$$w_{yz} := w_{yz} + \frac{w_{xy}w_{xz}}{\deg(x)}$$

In some embodiments, for a labeled point, no new node is created and the labeled point is merged into one of the existing labeled nodes. For example, if the point is labeled 0, then we add the appropriate weights can be added to the edges connecting the 0-node in graph H to all the unlabeled points in graph H.

At 611, a new point is inserted into the graph H and it is connected to all other nodes in the graph. In some embodiments, the weights of the edges of the nodes is calculated according to:

$$w_{xy} = \exp\left(-\frac{\|x-y\|_2^2}{\sigma^2}\right)$$

where σ is a parameter of the algorithm.

The labels in the graph are propagated at 613. In some embodiments, this comprises computing fractional labels for the unlabeled nodes currently in graph H. The Laplacian matrix is always non-invertible, however, for some embodiments a pseudo-inverse (called Moore-Penrose pseudo-inverse) version is used. The pseudo-inverse of L is denoted by L+. The fractional labels are computed using the pseudo-inverse of L as:

$$\tilde{f}_u = (L^+)_{ul} \cdot (L_{ll} - L_{lu}(L_{uu})^{-1}L_{ul}) \cdot \begin{pmatrix} 0 \\ 1 \end{pmatrix}$$

Note that $(L^+)_{ul}$ is a (τ×2)-matrix, $L_{ll}-L_{lu}(L_{uu})^{-1}L_{ul}$ is a (2×2)-matrix, and $$\begin{pmatrix} 0 \\ 1 \end{pmatrix}$$

is a (2×1) vector. Therefore $\tilde{f}_u$ is a vector with τ entries, one per unlabeled node in graph H. Therefore $\tilde{f}_u$ is a vector with entries, one per unlabeled node in graph H.

Note that in some embodiments the fractional labels $\tilde{f}_u$ are actually not contained in the interval [0; 1]. Instead, they are shifted by a number 0≤s≤1, meaning they are contained in the inverval [−s; 1−s]. However, if one wishes to undo the shift by s, it can be computed as follows:

$$\tilde{f}_l = (L^+)_{ll} \cdot (L_{ll} - L_{lu}(L_{uu})^{-1}L_{ul}) \cdot \begin{pmatrix} 0 \\ 1 \end{pmatrix}$$

Let x0, x1 be the two labeled nodes in graph H. Then $$s = f_l(x_0) - \tilde{f}_l(x_0) = f_l(x_1) - \tilde{f}_l(x_1)$$

Now s can be added to every label in $\tilde{f}_u$ to obtain labels $f_u$ which are contained in [0; 1]. These labels are the same labels if batch Label Propagation was run on the entire stream so far, without star-meshing away any points.

In most embodiments, graph H is maintained by storing its Laplacian matrix. Note that when weight w>0 is added to the edge between pair x, y, four Laplacian entries are updated: add w to L(x, x) and L(y, y), and subtract w from L(x, y) and L(y, x).

In some embodiments, a determination whether the result of the pre-filtering was proper is made at 615. For example, the feedback generator 125 determines whether the pre-filtering indication (e.g., the result of block 603) was correct or not, e.g., by comparing the propagated label for the "new" node (from block 613) with the result of block 603 to see if both agree or disagree. In some embodiments, when the pre-filtering was not proper, then feedback regarding the pre-filtering is provided to the pre-filtering logic for renormalization as detailed above including, but not limited to, changing an emphasis of a dimension/stream/etc. such as by increasing or decreasing a weight of the data.

The label propagator 117, in some embodiments, employs a strategy known as class mass normalization where it adjusts its output to roughly correspond to the a-priori expected fraction of each label in the data. This has been found to affect the quality of the labeling significantly. Note that simply using class mass normalization may not work for renormalization. For example, suppose anomaly detection is great and has 50% precision. Now ½ of the data is labeled as outliers correctly, but the true proportion of (rare) outliers in the data is unlikely to be that large, or even more than 1%. Suppose a "time of a random walk to hit a label" is used as a measure of labelling (label propagation), then there is a (potentially) artificial decrease in the time because half of the labels are outliers. which means that the precision will go down and outliers will start to be missed.

In some embodiments, a result of the determination of whether the result of the pre-filtering was proper is stored at 617. This storage allows a user to review the results of the pre-filtering and optionally provide manual feedback at 623 to cause an update to the pre-filter (such as renormalized) via block 602.

In some embodiments, a determination of whether an alarm should be triggered is made at 619. If an alarm is to be triggered, then one is triggered at 621. For example, an alert may be sent to a device, an audible alarm may be generated, a visual alarm may be indicated, etc. If an alarm is to not be generated, or alarming is not used, then the next unlabeled point is received at 601.

Figure 7:
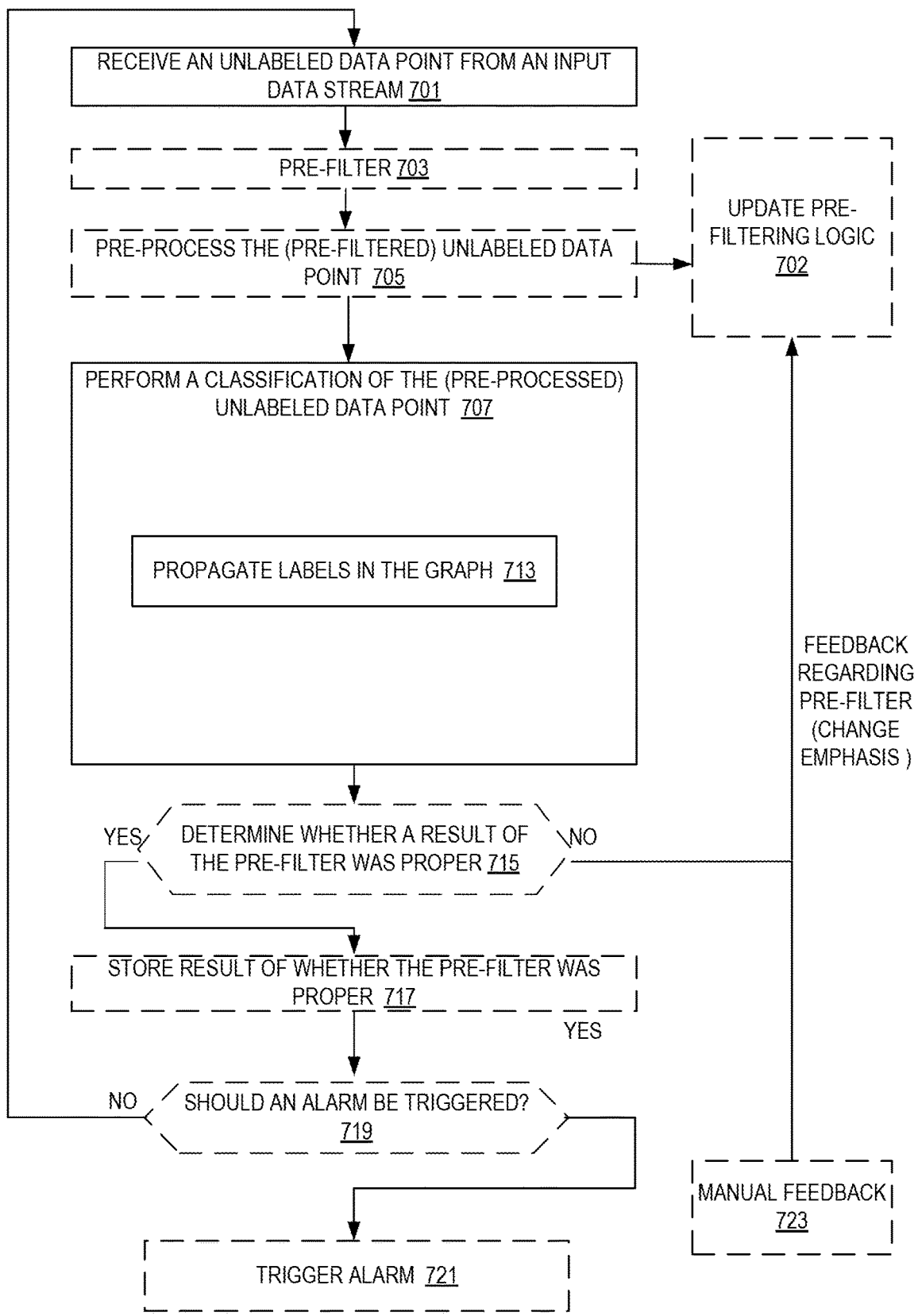
FIG. 7 illustrates an embodiment of a method for performing label processing.

FIG. 7 illustrates an embodiment of a method for performing streaming label processing. In some embodiments, this method is performed by a label processor such as that detailed with respect to FIG. 2.

At 701, at least one unlabeled data point from an input data stream is received. For example, a stream of unlabeled data points is provided to the streaming label processor 141.

In some embodiments, pre-filtering is performed at 703. Pre-filtering is performed by excluding points that satisfy a condition, such as, are all greater than 0, are all anomalies, or are all not anomalies, all satisfy a machine learned function, etc. For example, in some embodiments, anomaly detection is performed on the unlabeled data point to determine if the unlabeled data is anomalous with respect to past input at 703. For example, anomaly detection may include performing RRCF detection by pre-filter 103. In some embodiments, the output of the anomaly detection is an indication of an anomaly (or not) and the data (or an identifier of the data, and/or findings and other metadata created by the anomaly detection). In other embodiments, it is only the data that is anomalous. For ease of description, this output is called an "unlabeled data point" at times below. In some embodiments, pre-filter logic (e.g., pre-filter 103) is directed to be updated (such as renormalized) at this point at 702.

The output of the pre-filtering is subjected to pre-processing at 705 in some embodiments (where pre-processing is beneficial). For example, embedding engine 105 performs pre-processing such as a shingled difference calculation. At this point, the pre-filter logic (e.g., pre-filter 103) is directed to be updated (such as renormalized) in some embodiments at 702. For example, the data may be subjected to a different weight.

A classification of the (pre-processed and/or pre-filtered) unlabeled data point is made at 707. For example, the classifier 111 classifies the unlabeled data using label processing. The classification may be done on a graph, matrix, kNN, or other data structure.

The labels in the graph are propagated at 713. In some embodiments, this comprises computing fractional labels for the unlabeled nodes.

In some embodiments, a determination whether the result of the pre-filtering was proper is made at 715. For example, the feedback generator 125 determines whether the pre-filter indication (such as an anomaly indication) was correct or not. If the detection was not proper, then feedback regarding the pre-filtering is provided to the pre-filter logic for updating (such as renormalization) as detailed above.

In some embodiments, a determination whether the result of the pre-filtering was proper is made at 715. For example, the feedback generator 125 determines whether the pre-filtering indication (e.g., the result of block 703) was correct or not, e.g., by comparing the propagated label for the "new" node (from block 713) with the result of block 703 to see if both agree or disagree. When the pre-filtering was not proper, then feedback regarding the pre-filtering is provided to the pre-filter logic for renormalization as detailed above including, but not limited to, changing an emphasis of a dimension/stream/etc. such as by increasing or decreasing a weight of the data.

The label propagator 117, in some embodiments, employs a strategy known as class mass normalization where it adjusts its output to roughly correspond to the a-priori expected fraction of each label in the data. Note that simply using class mass normalization may not work for renormalization. For example, suppose the anomaly detection is great and has 50% precision. Now ½ of the data is labeled as outliers correctly, but the true proportion of (rare) outliers in the data is unlikely to be that large, or even more than 1%. Suppose a "time of a random walk to hit a label" is used as a measure of labelling (label propagation), then there is a (potentially) artificial decrease in the time because half of the labels are outliers. which means that the precision will go down and outliers will start to be missed.

In some embodiments, a result of the determination of whether the result of the pre-filtering was proper is stored at 717. This storage allows a user to review the results of the pre-filtering and optionally provide manual feedback at 723 to cause an update of the pre-filtering logic (such as renormalization) via block 702.

In some embodiments, a determination of whether an alarm should be triggered is made at 719. If an alarm is to be triggered, then one is triggered at 721. For example, an alert may be sent to a device, an audible alarm may be generated, a visual alarm may be indicated, etc. If an alarm is to not be generated, or alarming is not used, then the next unlabeled point is received at 401.

Figure 8D:
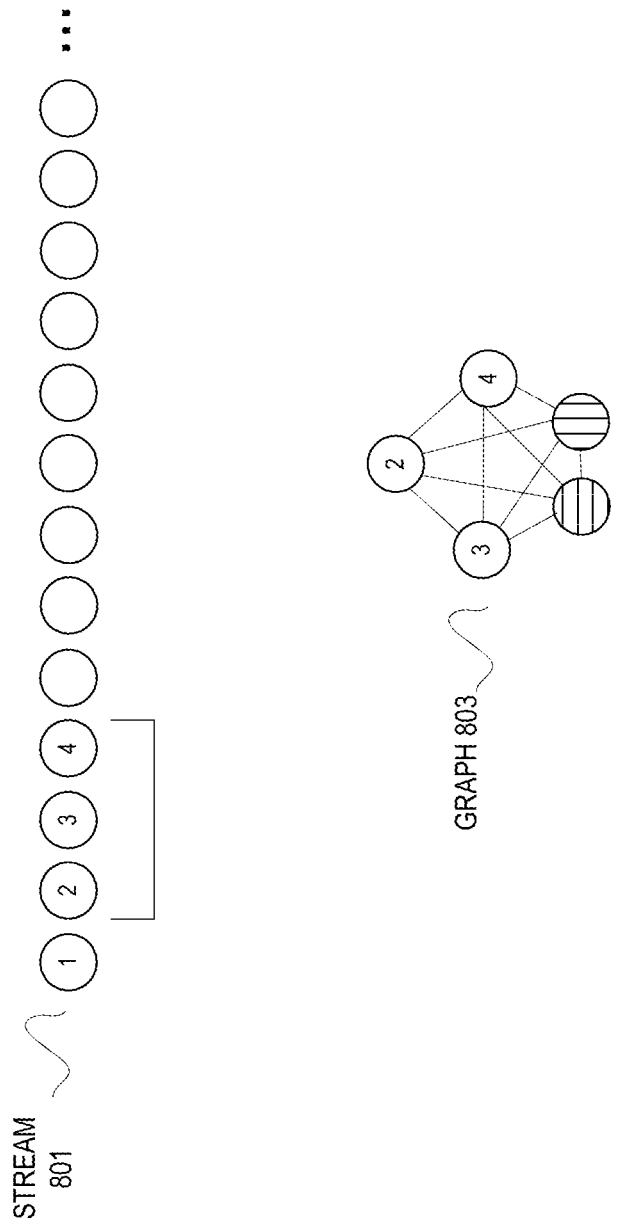

FIGS. 8(A)-(D) illustrate an example of a stream of unlabeled data and its impact on a graph. In FIG. 8(A) three unlabeled points from stream 801 have already been added to the graph 803 as nodes 1, 2, and 3, respectively, as the first T points. The vertically and horizontally shaded nodes of the graph 803 are the known labels (such as 0 and 1). Note that each node is connected to all other nodes and each of the connections is weighted.

In FIG. 8(B) a new unlabeled data point (4) is input from the stream 801. The node corresponding to unlabeled point 1 of the stream 801 is removed from the graph 803. The dashed lines around the node indicate the removal.

In FIG. 8(C) all of the connections associated with the removed node are also cleared. As such, only nodes 2 and 3 and the labeled nodes are connected. Each of the connections is reweighted as detailed above. FIGS. 8(B) and 8(C) represent star-meshing in some embodiments.

In FIG. 8(D) a new node for unlabeled point 4 is created in the graph 803 along with new connections. Each of the connections (new and old) are reweighted as detailed above. This is the propagation of labels.

FIGS. 9(A)-(C) illustrate an example of a stream of unlabeled data and its impact on a graph as shown as matrices. FIG. 9(A) shows a Laplacian matrix with three consecutive unlabeled points (−0.733, −0.735, and −0.737). In some embodiments, these points represent a shingle [−0.733, −0.735, and −0.737].

In FIG. 9(B) the oldest point (−0.733) has been removed from the matrix 119 and the Laplacian matrix after star-mesh is shown.

In FIG. 9(C) a new node for unlabeled point (−0.726) is added and label propagation is complete. The shingle used for this was [−0.735, −0.737, and −0.0726].

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Figure 10:
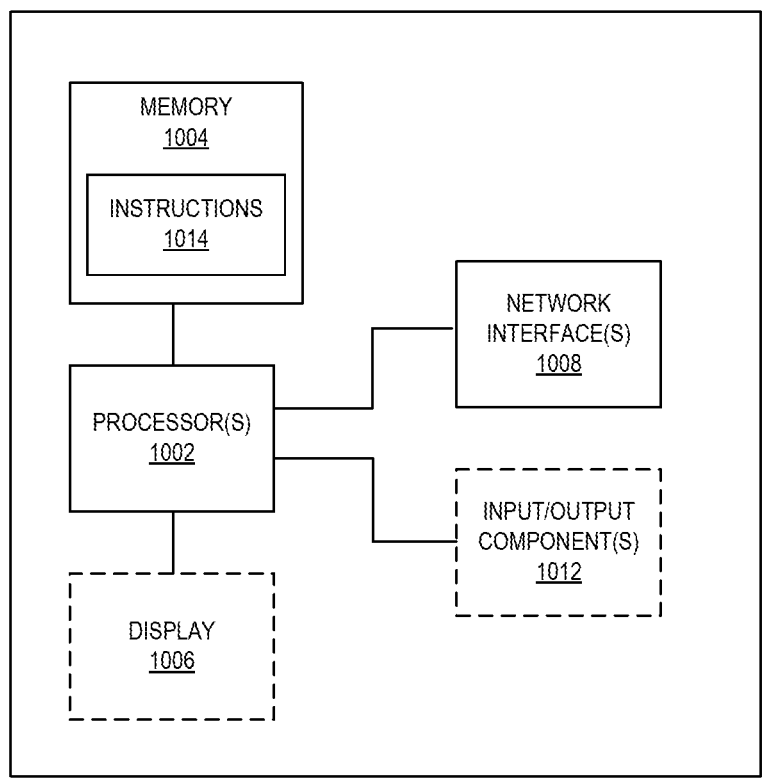
FIG. 10 illustrates a logical arrangement of a set of general components of an exemplary computing device that can be utilized in accordance with various embodiments.

FIG. 10 illustrates a logical arrangement of a set of general components of an example computing device 1000 such as the processors detailed above, etc. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (e.g., instructions 1014) and/or data, and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1014) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
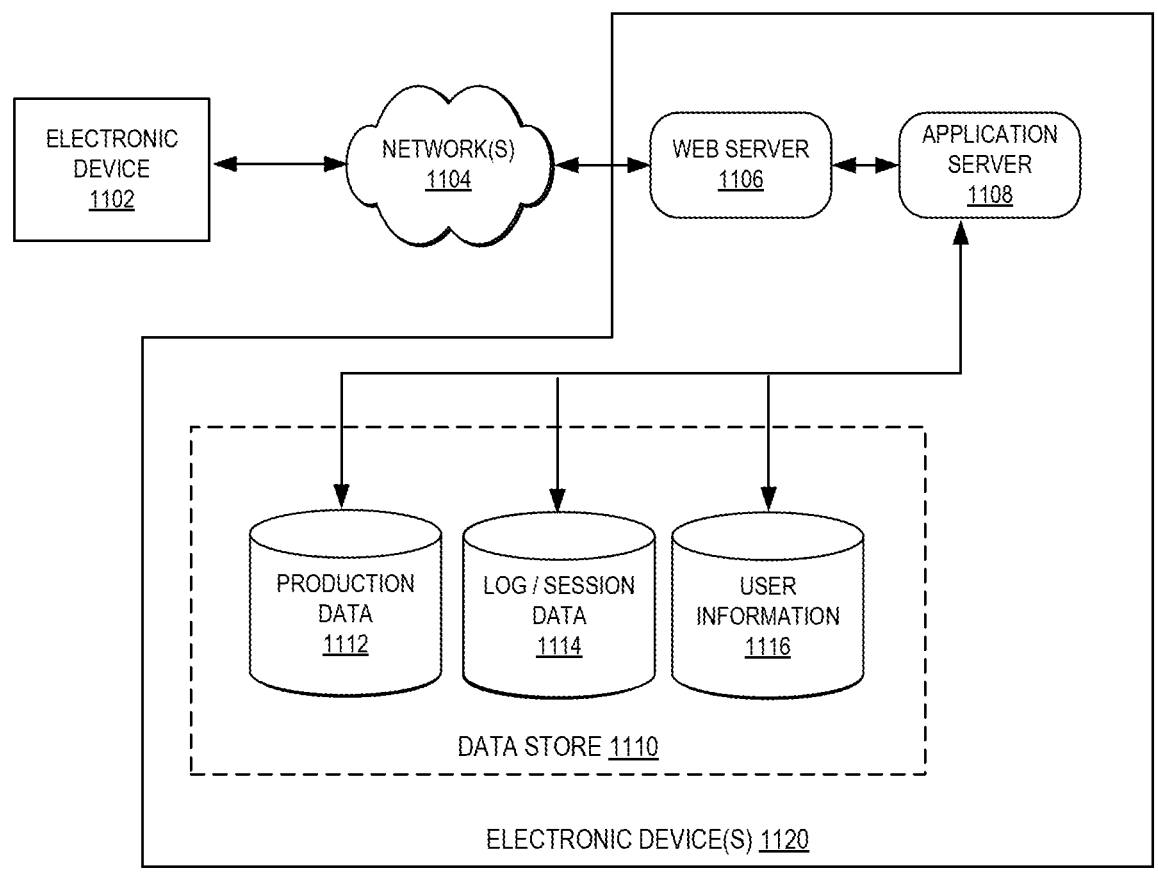
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments the messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-well state storage devices such as random-access memory (RAM) or read-only memory (ROM), as as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   one or more non-transitory computer-readable storage media; and
   program instructions stored on the one or more non-transitory computer readable storage media that, when read and executed by a processing system, direct the processing system to:

receive a plurality of unlabeled data points from an input stream;

perform anomaly detection on a data point of the unlabeled data points using an anomaly detection engine;

pre-process the data point of the unlabeled data points to generate a pre-processed unlabeled data point; and classify the pre-processed unlabeled data point by:

maintaining, in memory, a graph of nodes including a defined maximum dimension, such that when a first node is removed from the graph of nodes the first node is replaced with a second node including a same amount of information as the first node, such that the memory maintains the defined maximum dimension of the graph of nodes;

removing an oldest node from the graph of nodes; and inserting a new node in the graph of nodes for the pre-processed unlabeled data point, the new node including a same amount of information as the oldest node, such that the memory maintains the defined maximum dimension of the graph of nodes.

2. The apparatus of claim 1, wherein the pre-processing is performed by generating a normalized shingle difference between a shingle including the anomalous data points and subsequent shingles of unlabeled data points in the input stream.

3. The apparatus of claim 1, wherein the anomaly detection comprises a robust random cut forest detection.

4. A computer-implemented method comprising:

receiving a plurality of unlabeled data points from an input stream;

performing anomaly detection on a data point of the unlabeled data points using an anomaly detection engine;

pre-processing the data point of the unlabeled data points to generate a pre-processed unlabeled data point; and classifying the pre-processed unlabeled data point by:

maintaining, in memory, a graph of nodes including a defined maximum dimension, such that when a first node is removed from the graph of nodes the first node is replaced with a second node including a same amount of information as the first node, such that the memory maintains the defined maximum dimension of the graph of nodes;

removing an oldest node from the graph of nodes; and inserting a new node in the graph of nodes for the pre-processed unlabeled data point, the new node including a same amount of information as the oldest node, such that the memory maintains the defined maximum dimension of the graph of nodes.

5. The computer-implemented method of claim 4, wherein the pre-processing the data point of the unlabeled data points comprises generating a normalized shingle difference between a shingle including the data point of the unlabeled data points and subsequent shingles of unlabeled data points in the input stream.

6. The computer-implemented method of claim 4, wherein the input stream is a real-time stream.

7. The computer-implemented method of claim 4, wherein the classifying the pre-processed unlabeled data point further comprises updating edge weights associated with weighted edges between the nodes in the graph of nodes.

8. The computer-implemented method of claim 4, wherein removing the oldest node from the graph of nodes comprises star-meshing out the oldest node from the graph of nodes.

9. The computer-implemented method of claim 8, wherein the graph of nodes is stored in the memory as a matrix.

10. The computer-implemented method of claim 9, wherein the matrix is a Laplacian matrix.

11. The computer-implemented method of claim 10, wherein the classifying the pre-processed unlabeled data point further comprises computing fractional labels for unlabeled nodes of the graph of nodes using a pseudo-inverse of the Laplacian matrix.

12. The computer-implemented method of claim 4, wherein the anomaly detection comprises a robust random cut forest detection.

13. The computer-implemented method of claim 4, further comprising outputting information about the pre-processed unlabeled data point to a feedback generator.

14. A system comprising:

a processor; and a memory storing instructions that, when executed by the processor, cause the processor to:

receive a plurality of unlabeled data points from an input stream;

perform anomaly detection on a data point of the unlabeled data points using an anomaly detection engine;

pre-process the data point of the unlabeled data points to generate a pre-processed unlabeled data point;

classify the pre-processed unlabeled data point by:

maintaining, in the memory, a graph of nodes including a defined maximum dimension, such that when a first node is removed from the graph of nodes the first node is replaced with a second node including a same amount of information as the first node, such that the memory maintains the defined maximum dimension of the graph of nodes;

removing an oldest node from the graph of nodes; and inserting a new node in the graph of nodes for the pre-processed unlabeled data point, the new node including a same amount of information as the oldest node, such that the memory maintains the defined maximum dimension of the graph of nodes;

determine the anomaly detection was not proper based on a comparison of a result of the anomaly detection and a result of the classifying of the pre-processed unlabeled data point; and in response to determining the anomaly detection was not proper, provide feedback to the anomaly detection engine to change at least one emphasis used in the anomaly detection.

15. The system of claim 14, wherein the pre-processing the data point of the unlabeled data points comprises generating a normalized shingle difference between a shingle including the data point of the unlabeled data points and subsequent shingles of unlabeled data points in the input stream.

16. The system of claim 14, wherein the input stream is a real-time stream.

17. The system of claim 14, wherein the classifying the pre-processed unlabeled data point further comprises updating edge weights associated with weighted edges between the nodes in the graph of nodes.

18. The system of claim 14, wherein removing the oldest node from the graph of nodes comprises star-meshing out the oldest node from the graph of nodes.

19. The system of claim 14, wherein the graph of nodes is stored in the memory as a matrix.

20. The system of claim 19, wherein the matrix is a Laplacian matrix.

21. The system of claim 20, wherein the classifying the pre-processed unlabeled data point further comprises computing fractional labels for unlabeled nodes of the graph of nodes using a pseudo-inverse of the Laplacian matrix.

* * * * *